Dec. 9, 1941.  W. G. BURHANS  2,265,471

OIL CLARIFIER

Filed Oct. 9, 1936  5 Sheets-Sheet 1

Inventor
W. G. Burhans

By *Clarence A. O'Brien*
*Hyman Berman*
Attorneys

Dec. 9, 1941.                W. G. BURHANS                2,265,471
                              OIL CLARIFIER
                          Filed Oct. 9, 1936           5 Sheets-Sheet 2

Inventor
W. G. Burhans
By Clarence A. O'Brien
Hyman Berman
Attorneys

Dec. 9, 1941.     W. G. BURHANS     2,265,471
OIL CLARIFIER
Filed Oct. 9, 1936     5 Sheets-Sheet 4

Inventor
W. G. Burhans
By Clarence A. O'Brien
Hyman Berman
Attorneys

Dec. 9, 1941.   W. G. BURHANS   2,265,471
OIL CLARIFIER
Filed Oct. 9, 1936   5 Sheets-Sheet 5
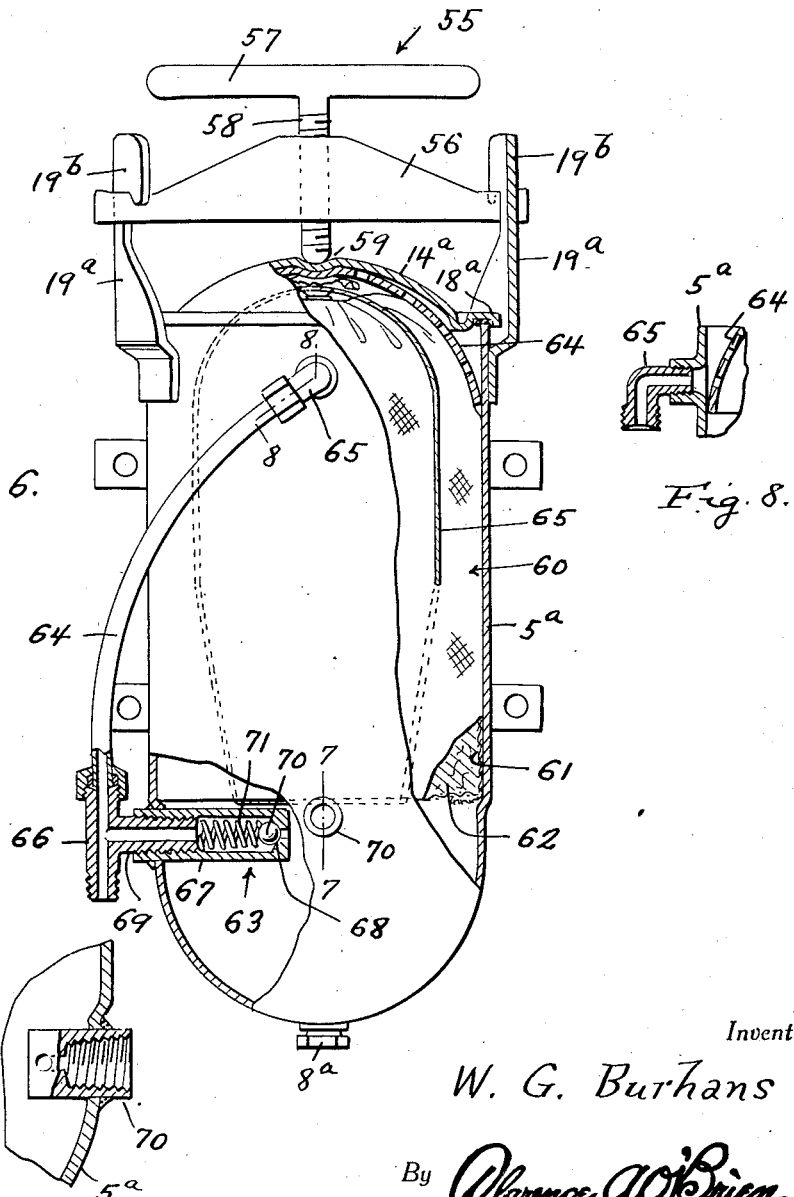
Inventor
W. G. Burhans
By Clarence A. O'Brien
Hyman Berman
Attorneys Patented Dec. 9, 1941

2,265,471

UNITED STATES PATENT OFFICE 2,265,471

OIL CLARIFIER

William G. Burhans, Kingston, N. Y.

Application October 9, 1936, Serial No. 104,896

12 Claims. (Cl. 210—131)

This invention appertains to new and useful improvements in liquid clarifiers, the same being a continuation in part of my co-pending application Serial No. 7097, filed February 18, 1935, which has now become U. S. Patent No. 2,068,263.

The principal object of the present invention is to provide novel by-pass means for accommodating the filtering cartridges, the subject matter of which has been divided from my above specified application.

Another important object of the invention is to provide a clarifier of the character stated involving by-pass means so that should the filtering means become clogged, the liquid or oil could by-pass the filtering means.

Other important objects and advantages of the invention will become apparent to the reader of the following specification.

In the drawings:

Figure 6 is a side elevational view partly in section of another form of the invention showing the outside by-pass.

Figure 7 is an enlarged fragmentary sectional view on line 7—7 of Figure 6.

Figure 8 is a fragmentary detailed sectional view on line 8—8 of Figure 6.

Figure 1:
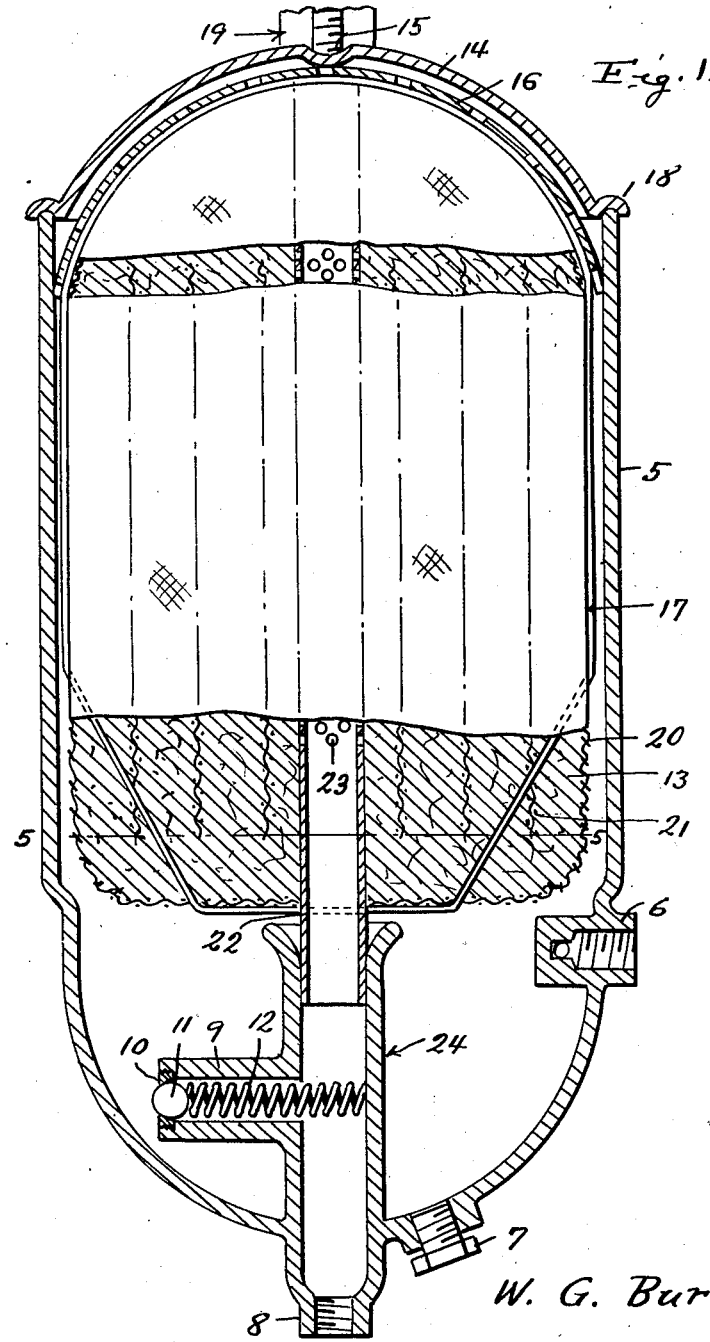
Figure 1 represents a vertical sectional view through one form of the invention.

Referring to the drawings wherein like numerals designate like parts, it can be seen in Figure 1 that the numeral 5 represents the shell having the oil inlet fitting 6 adjacent the bottom thereof as well as the drain plug 7 and outlet nipple 8. Outlet nipple 8 is in the form of a fitting projecting upwardly into the lower portion of the casing and having a laterally extending barrel 9 provided with a ball seat at its outer end against which the internal ball 11 can seat. A coiled compressible spring 12 urges this ball into seated position so that as oil enters through the fitting 6 the oil will first pass through the filtering material 12, but should this be clogged, it will pass into the by-pass fitting through the barrel 9 by overcoming the tension of the spring 12.

Again referring to Figure 1, it can be seen that numeral 14 represents the cap which has a depressed central portion 15 bearing against the concave-convex shaped perforated cup 16 which bears against the upper hemi-spherical shaped top end of the filtering cartridge 17. The peripheral portion of the cap 14 is provided with a grooved flange 18 adapted to seat upon the upper edge of the casing 5 and suitable clamp means 19 is employed for clamping the cap 14 in place.

The cartridge 17 is provided with a jacket 20 of mesh wire or similar material and a sheet 21 of this material is embedded spirally in the filtering mass 13.

An elongated tube 22 extends longitudinally and axially through the cartridge 17 and is provided with perforations 23 therein. The lower portion of the tube depends into the upper flared end portion of the fitting generally referred to by numeral 24. Thus it can be seen that when oil enters through the fitting 6 it cannot get out of the lower chamber of the casing 5 and must force its way up through the filtering material 13 until it is able to reach the opening 23 from which it drains into the tube 22 and from there through the fitting 24 to the outlet fitting 8. Thus the oil is filtered. However, should the filtering material become clogged, to relieve the pressure, the by-pass fitting 24 comes into play. The oil under pressure will overcome the valve 11 and the oil will escape by way of the fitting 24 to the outlet 8.

Figure 2:
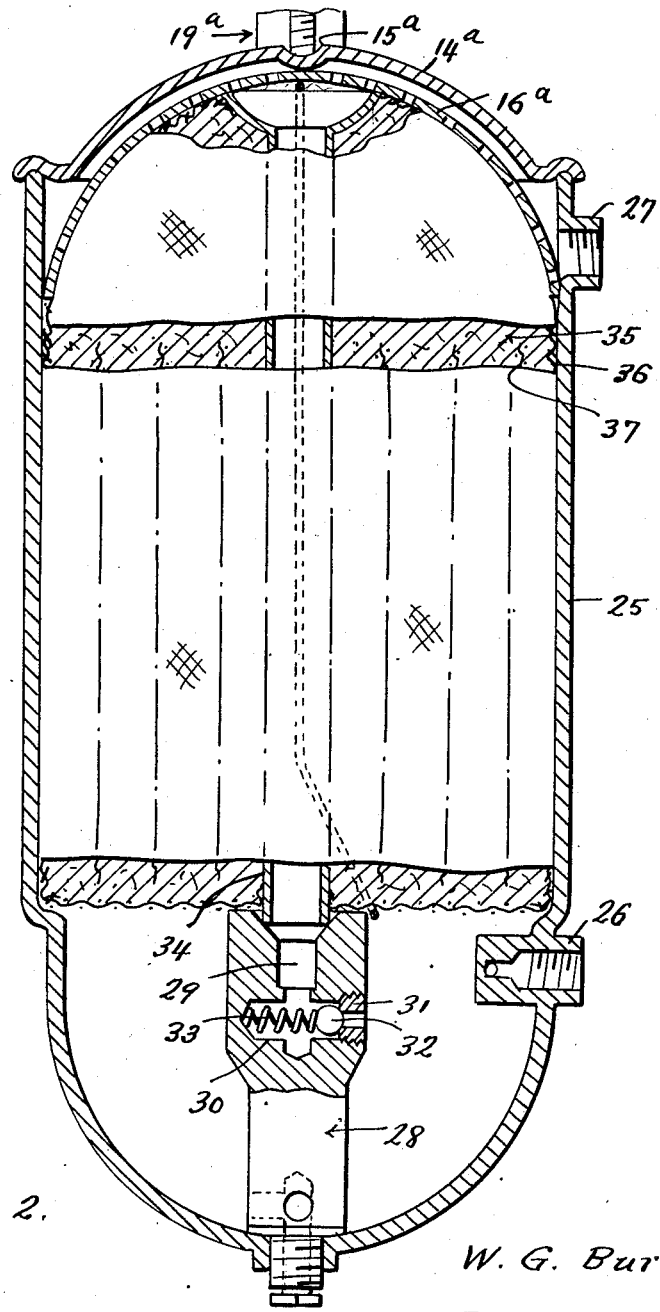
Figure 2 is a vertical sectional view through another form of the invention.

Referring to the form of the invention shown in Figure 2, it can be seen that reference character 25 represents the casing which is provided with the inlet fitting 26 adjacent its lower end and the outlet nipple 27 adjacent its upper end.

An upstanding by-pass unit generally referred to by numeral 28 is mounted within the lower portion of the casing 25 and has the short bore 29 extending downwardly from the top thereof. Numeral 30 represents a cross-bore intersecting the bore 29 and provided with a bushing 31 in one end serving as a seat for the valve 32, which is urged normally against the seat 31 by the spring 33. The upper end of the bore 29 is flared to receive the lower end of the tube 34 which extends axially through the filtering cartridge 35. This tube 34 is not provided with openings as is the tube 22. The cartridge 35 is provided with the jacket 36 of mesh material and the embedded spirally wound sheet 37 of the same material. Reference character 16a is the perforated cup corresponding to the cup 16 which is urged downwardly against the top of the cartridge 35 by the depressed portion 15a of the clamp 19a, with the cap 14a constructed and engaged with the top of the casing 25 as is the cap 14. Thus it can be seen, that oil entering the shell through the fitting 26 must pass entirely through the cartridge 35 before reaching the outlet 27. However, should the filtering material of the cartridge 35 be clogged, the oil under pressure will overcome the valve 32 and the oil will be free to pass up the tube 34 to the top of the cartridge, from where it can pass over the perforated cup 16a to the outlet 27.

Figure 3:
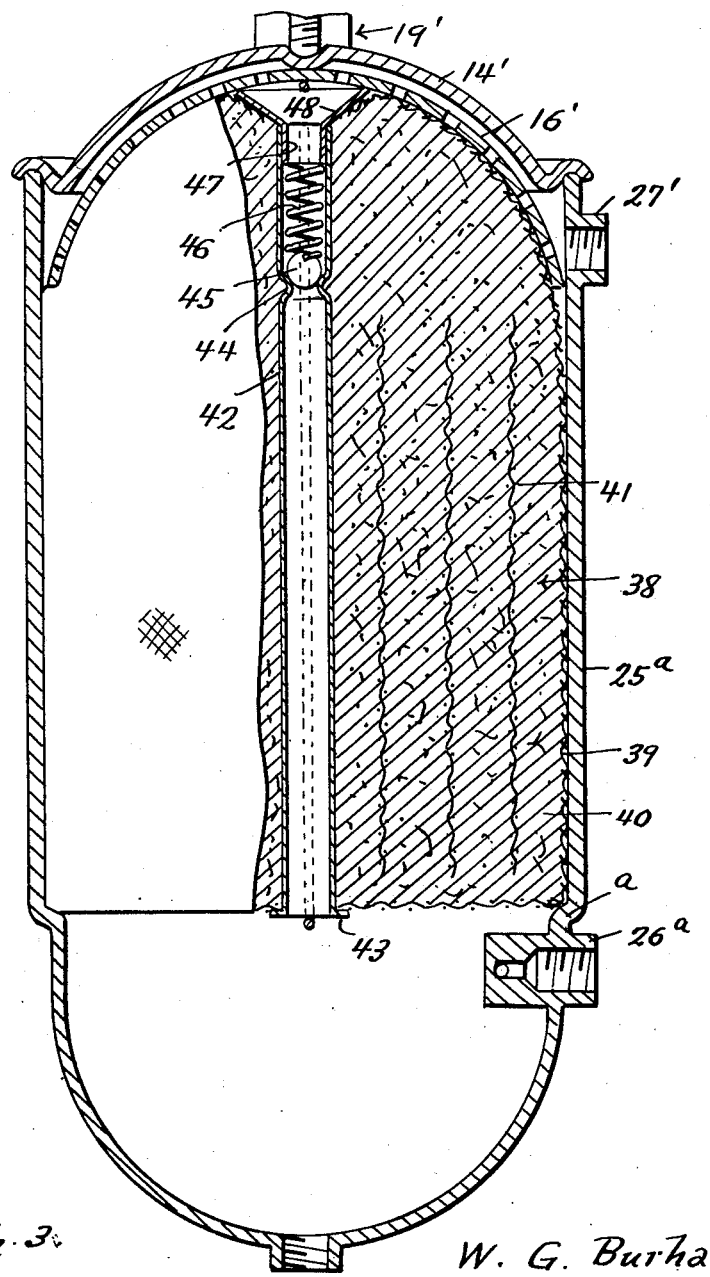
Figure 3 is a vertical sectional view through the third form of the invention.

Figure 3 shows a third form of the invention wherein numeral 38 denotes the improved cartridge which self-contains the by-pass. The casing 25a is provided with the inlet fitting 26 for oil and is provided as in the case of the other casings of the other forms with an internal shoulder a upon which the cartridge 38 rests. This cartridge consists of the outer jacket 39 having the filtering material 40 therein and in this filtering material is the spirally wound sheet 41 of mesh material. Extending longitudinally and axially through the cartridge 38 is the tube 42 which is flanged at its lower end as at 43 to bear against the bottom of the cartridge. A portion of the cartridge adjacent the upper end thereof is constricted as at 44 to provide a seat for the downwardly pressing ball 45, which is urged downwardly by the corded compressible spring 46 interposed between the said ball and the neck portion 47 of the funnel 48, which neck portion depends into the upper portion of the tube 42.

Thus it can be seen, that oil passing through the fitting 26a must pass upwardly through the material 40 and through the perforated cup-shaped plate 16' to reach the outlet 27'. However, if this material 40 clogs, the oil under pressure must pass upwardly through the tube 42 and overcome the tension of the valve 45 and from there passes out through the funnel 48 and above the cup 16' from where it flows to reach the outlet 27'. The clamp means for the top 14' is denoted by reference character 19'.

Figure 4:
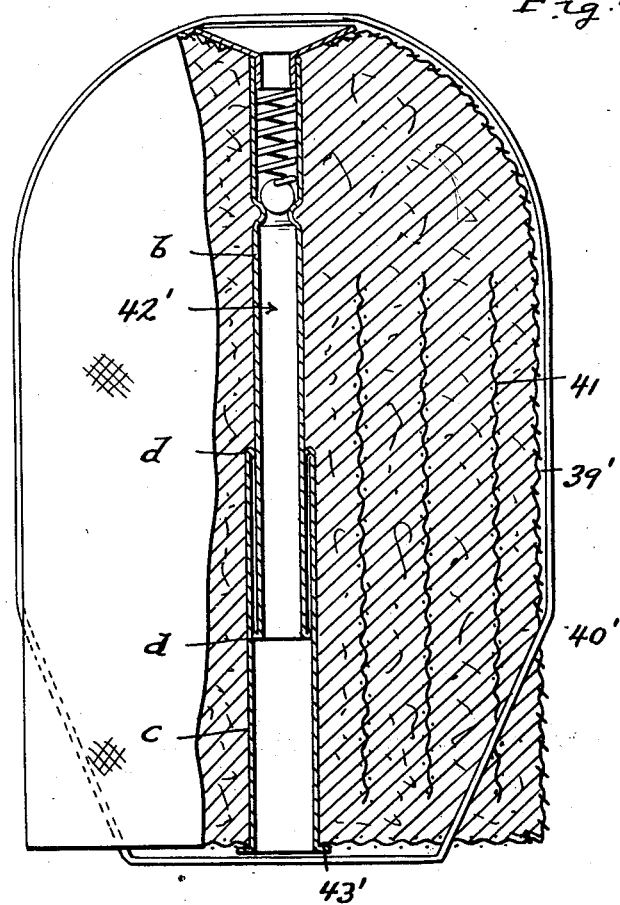
Figure 4 is a vertical sectional view through the form of cartridge shown in Figure 3 with which an adjustable by-pass tube is disposed therethrough.
Figure 5:
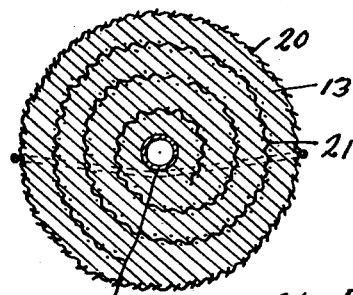
Figure 5 is a cross sectional of Figure 4.

The form of the invention shown in Figure 4 is based on the self-contained by-pass of the type of cartridge shown in Figure 3. Aside from this by-pass tube the balance of the construction is identical with the form of the invention shown in Figure 3. This cartridge consists of the jacket 39' of mesh material having the spirally wound sheet 41' of mesh material embedded in the filtering material 40'. The by-pass structure is generally referred to by numeral 42' is longitudinally disposed through the cartridge and its only distinction over the corresponding structure shown in Figure 3 is that the elongated tube is divided into the upper section b and the lower section c, these sections telescoping with the lower section c provided with the flange 43'. The upper end of the section c and the lower end of the section b are provided with engageable flanges d. This telescopic or sliding connection of the sections b and c permits the cartridge to be compressed longitudinally in getting the cartridge to fit snugly in the shell 25a.

Figure 6 discloses a form of the invention which employs an outside by-pass. In this form of the invention reference character 5a denotes a shell open at its top and provided with a bowl-shaped bottom portion having a drain plug 8a therein.

Upstanding from the upper edge portion of the shell 5a are the risers 19a—19a provided with hook formations 19c—19b at their upper ends. A clamp structure generally referred to by numeral 55 consists of the cross bar 56 having reduced end portions engageable with the hook formations 19b—19b. A handle 57 is provided with the screw extension 58 which is feedable through the intermediate portion of the cross bar 56 and against the recess 59 in the central portion of the dome-shaped cover 14a which has a peripheral flange 18a for engagement against the upper edge of the shell 5a.

In this form of the invention numeral 60 represents the cartridge which consists of the gauze jacket 61 and the filtering filler 62. This cartridge does not employ any by-pass through the same as shown in Figure 1 but requires oil to either pass through the valve generally referred to by numeral 63 in the event the cartridge is clogged or else through the cartridge and the by-pass tube 64.

The cartridge is provided with the endless wire bail 65 as is also present in the cartridges of the other forms of the invention disclosed here, the bail being free at its upper end so that it can be grasped after the cover 14a and the perforated cup 64 have been removed to facilitate extraction of the cartridge from the shell 5a.

The inverted perforated cup-shaped structure 64 of course keeps the upper end of the cartridge away from the lid 14a so that the oil which has filtered through the cartridge can pass through the fitting 65 and the pipe 64 to the T-fitting 66 where it goes to its working point.

The valve 63 which is located in the lower portion of the shell 5a consists of the barrel 67 having the valve seat 68 at its inner end and internally threaded at its opposite end to receive the threaded portion 69 of the T-fitting 66. A pawl 70 is normally urged against the seat 68 by the spring 71 so that oil cannot enter the fitting 66 by way of this valve 63 unless the cartridge 60 is exceptionally clogged.

While the foregoing specification sets forth the invention in specific terms, it is to be understood that numerous changes in the shape, size and materials may be resorted to without departure from the spirit and scope of the invention as claimed hereinafter.

Having described the invention what is claimed as new is:

1. A clarifier of the character described comprising a casing having a removable top, a cartridge of filtering material disposed in the casing, a fluid inlet at the lower portion of the casing, an outlet at the upper portion of the casing and means in the casing for by-passing fluid entering through the inlet to the outlet in the event the filtering material becomes clogged, and said filtering material being in the form of a cartridge provided with a spirally wound sheet of mesh material embedded therein.

2. A clarifier comprising a casing, a yieldable cartridge of filtering material in the casing, a fluid inlet at the lower portion of the casing, a tube extending longitudinally through the cartridge and having a check valve therein, said casing being provided with an outlet adjacent its upper end, said tube being divided into a pair of telescoping sections.

3. A cartridge for filters comprising a body of filtering material, a bail-like structure extending along the sides of the body and over the top thereof, said body being provided with a depression in the top portion thereof over which the upper portion of the bail-like structure extends to define a hand grip portion, the lower portions of the bail being disposed inwardly through the lower portion of the body and downwardly to pass across the bottom of the body.

4. A filtering cartridge of the character stated comprising a body of filtering material of yieldable consistency, a by-pass tube extending longitudinally through the body and being divided into a pair of extensible sections, the outer ends of the sections being flanged outwardly to bear against the ends of the body.

5. A filtering cartridge of the character described comprising a body of filtering material having a by-pass tube extending longitudinally therethrough, a portion of the tube at an intermediate point being constricted to define a valve seat and a spring-pressed ball valve in the tube engaged with the seat, said constricted portion being located adjacent one end of the tube, a tubular member having a laterally disposed flange for abutting one end of the filtering body, said tubular member being disposed into the end of the tube adjacent the constricted portion, said spring projected ball valve including a compressible coiled spring interposed between the ball and the inner end of the tubular member.

6. A filter cartridge comprising a sheet of wire mesh arranged in a spiral with its convolutions spaced from each other, porous filtering material located between said convolutions, and a cover for the mesh and said porous filtering material, said cover comprising a fabric bag providing, under the expanding action of the wire mesh and porous filtering material therein, a substantially cylindrical bounding surface for the filter, and a disc-shaped substantially flat pervious bottom for the cartridge secured to the edges of the cylindrical bounding surface provided by said bag.

7. A filter cartridge comprising a sheet of wire mesh arranged in a spiral with its convolutions spaced from each other, porous filtering material located between said convolutions, and a cover for the mesh and said porous filtering material, said cover comprising a fabric bag providing, under the expanding action of the wire mesh and porous filtering material therein, a substantially cylindrical bounding surface for the filter, and a disc-shaped fabric bottom for the cartridge secured to the edges of the cylindrical bounding surface provided by said bag and stretched thereby into a substantially flat condition.

8. A filter cartridge comprising a sheet of wire mesh arranged in a spiral with its convolutions spaced from each other, porous filtering material located between said convolutions, and a cover for the mesh and said porous filtering material, said cover comprising a fabric bag providing, under the expanding action of the wire mesh and porous filtering material therein, a substantially cylindrical bounding surface for the filter, the cylindrical surface extending in the direction of the axis of said spiral.

9. A filter cartridge comprising a sheet of wire mesh arranged in a spiral with its convolutions spaced from each other, porous filtering material located between said convolutions, and a cover for the mesh and said porous filtering material, said cover comprising a fabric bag providing, under the expanding action of the wire mesh and porous filtering material therein, a substantially cylindrical bounding surface for the filter, the cylindrical surface extending in the direction of the axis of said spiral, and a pervious bottom for the cartridge closing the cylindrical cover provided by said bag, the edges of said wire mesh spiral closely approaching said pervious bottom.

10. A filter cartridge comprising a sheet of wire mesh arranged in a spiral with its convolutions spaced from each other, a porous filtering material located between said convolutions, and a cover for the mesh and said porous filtering material, said cover comprising a fabric bag providing, under the expanding action of the wire mesh and porous filtering material therein, a substantially cylindrical bounding surface for the filter, the cylindrical surface extending in the direction of the axis of said spiral, and a pervious bottom for the cartridge closing the cylindrical cover provided by said bag.

11. A filter cartridge comprising porous filtering material, and a cover for said filtering material, said cover comprising a fabric bag providing, under the expanding action of the filtering material therein, a substantially cylindrical bounding surface for the filter, and a tubular member extending through the filtering material along the axis of said cylindrical bounding surface and connected to said cover at its ends which terminate adjacent the upper and lower ends of the cartridge, so that the tube forms a part of the cartridge and is removable from and insertible into a casing therewith.

12. A filter cartridge comprising porous filtering material, and a cover for said filtering material, said cover comprising a fabric bag providing, under the expanding action of the filtering material therein, a substantially cylindrical bounding surface for the filter, a tubular member extending through the filtering material along the axis of said cylindrical bounding surface and connected to said cover at its ends which terminate adjacent the upper and lower ends of the cartridge, so that the tube forms a part of the cartridge and is removable from and insertible into a casing therewith, and a check valve in said tube.

WILLIAM G. BURHANS.